UNITED STATES PATENT OFFICE.

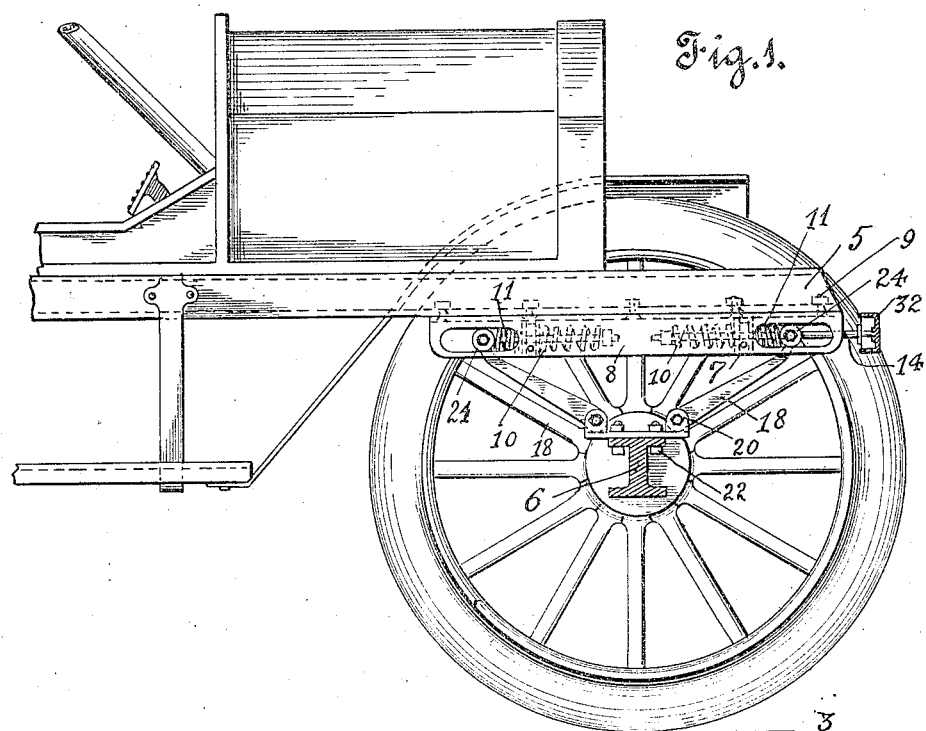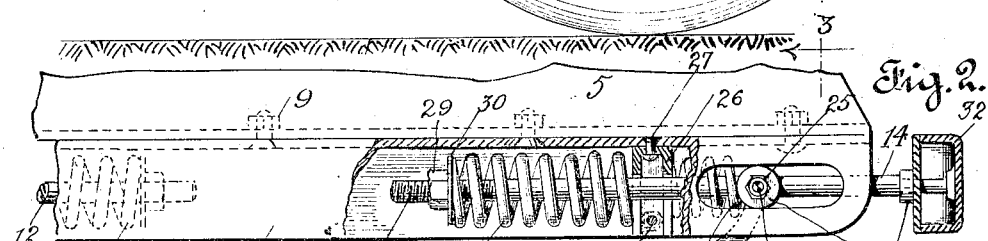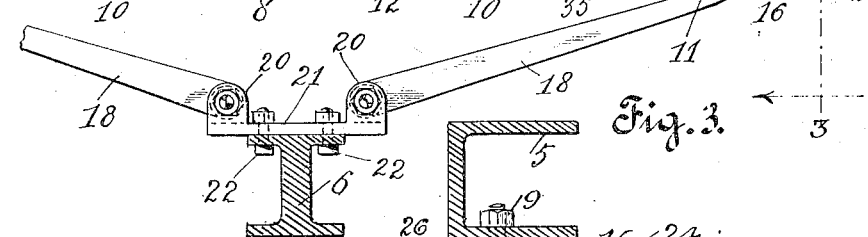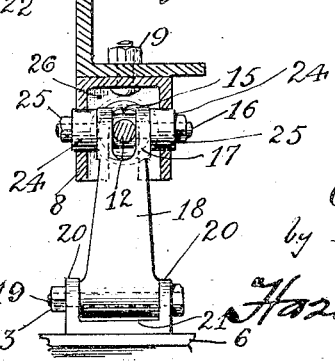

CHARLES G. BOOTH AND FRANK SANKS, OF POMONA, CALIFORNIA.

VEHICLE-SPRING.

1,134,030.

Specification of Letters Patent.

Patented Mar. 30, 1915.

Application filed August 6, 1913. Serial No. 783,328.

*To all whom it may concern:*

Be it known that we, CHARLES G. BOOTH and FRANK SANKS, both citizens of the United States, residing at Pomona, in the county of Los Angeles and State of California, have invented new and useful Improvements in Vehicle-Springs, of which the following is a specification.

This invention relates to vehicle springs, and the principal object is to provide a vehicle spring combined with a shock absorber.

It is also an object to provide a vehicle spring formed of a plurality of coiled spring members.

It is also an object to provide a vehicle spring in which the resilient members are protected from the weather and located in horizontal relation in connection with the vehicle frame.

It is a further object to provide means for slidably mounting the connections from the vehicle axle and the springs together with means for supporting a bumper in connection with the forward springs applied to a vehicle.

In the drawings accompanying this specification and forming therewith the application for Letters Patent: Figure 1 shows an application of the device to the forward frame of a motor vehicle. Fig. 2 is an enlarged detail in side elevation of the spring, a portion being broken away. Fig. 3 is a cross section on the line 3—3 of Fig. 2, viewed in the direction indicated by the arrows.

More specifically in the drawings, 5 designates one of the longitudinal side frames of an automobile of the channeled type, to which is secured the axle 6 of the common cross sectional construction, the resilient support therefor being shown as an improved spring and shock absorber 7. Primarily this combined spring and shock absorber consists of a supporting member 8 shown as a channeled structure secured to the frame 5 by means of bolts 9 in such position that the flanges extend downwardly and are spaced apart to form a guide way for the springs 10 and 11 mounted therein. These springs encircle rods 12, the forward rod of the pair being provided with an extension 14 beyond the central hub 15 formed thereon, this hub being provided with a transverse bore which is adapted to support the axle or pin 16 which passes through the bores in the yoked ends 17 of the connecting arms 18. The lower end of arms 18 are preferably extended to a greater width each having a longitudinal bore therethrough adapted to carry a hinge pin 19 which is supported in bores in the lugs 20, a pair of these being formed on either side of the axle plate 21. This plate is secured to the flanges of the axle 6 by bolts 22.

Secured to the outside of the yokes 17 and the arms 18 are rollers 24 one on either side which are adapted to travel in the longitudinally disposed slots of the depending flanges of the member 8, the rollers being held in position by means of nuts 25 secured to either end of the axle 16.

The spring 11 previously mentioned is of less length and tension than the spring 10 and is adapted to be interposed between the hub 15 and the slotted stop 26, this slotted stop being secured in proper relation to the member 8 by means of fastenings 27. The spring 10 bears on the other side of this slotted stop and the outer end of the spring rod 12 is threaded and provided with a nut 29 and washer 30 so that the tension of the springs 10 and 11 may be adjusted to suit individual requirements or take up for loss of tension due to use.

As previously stated, the forward spring rod 12 is provided with extensions and with this exception the other part of the component spring is exactly similar to that described and will receive the same designation numbers, the extension 14 being provided of such length as to extend beyond the end of the frame 5 and the member 8 such a distance as to form a support for the bumper 32, a flange 33 being formed on the rod acting as a stop to receive the thrust and the forward plate of the bumper of the usual configuration being secured by any desired means.

In assembling the springs on the rod they may be placed in position with the rod pivoted from the outer end of the slot, but when placed within the housing the bolt 35 is passed through the two flanges 8 and between the slotted legs of the slotted stop 26 preventing the rod from falling or being forced out of the horizontal position.

What we claim is:

1. A vehicle spring, in combination with a frame and axle of the vehicle, of a pair of arms pivotally secured to the axle, the free ends of said arms being in movable engagement with the vehicle frame, spring rods pivotally secured to the free ends of said pair of pivoted arms, said rods being reciprocally mounted on said vehicle frame, springs mounted on each of said spring rods, and a stop mounted on each of said spring rods and rigidly secured to said vehicle frame, said stops being interposed between the springs on said rods, whereby resiliency is imparted to the axle through the medium of the pivoted arms.

2. In combination with a frame and wheel axle of a vehicle, of a channeled body member secured thereto having slotted flanges depending below said frame and intermediate said axle and frame, pivoted arms secured to said axle and extending intermediate of the slotted flanges of said body, spring rods slidably supported within said flanges, roller means engaging said flanges to support said rods, means to connect said arms to said rods, a plurality of springs adapted to encircle said rods, and means interposed between each pair of springs on said rods to act as a stop therefor.

3. In combination with a frame and wheel axle of a vehicle, of a channeled body member secured thereto having slotted flanges depending below said frame and intermediate said axle and frame, pivoted arms secured to said axle and extending intermediate of the slotted flanges of said body, spring rods slidably supported within said flanges, roller means engaging said flanges to support said rods, means to connect said arms to said rods, a plurality of springs adapted to encircle each of said rods, slotted stops interposed between said springs, adjusting means on one end of each of said rods and means to support a bumper at the oppositely disposed end of each of said rods.

In witness that we claim the foregoing we have hereunto subscribed our names this 14th day of July, 1913.

CHARLES G. BOOTH.
FRANK SANKS.

Witnesses:
A. C. ABBOTT,
HERBERT BACON.